Feb. 9, 1971 W. M. BUSTIN ET AL 3,561,256
PIPELINE LEAK DETECTOR

Filed March 28, 1969 2 Sheets-Sheet 1

W. M. Bustin  Inventors
H. C. Cook

By Donald F. Wohlers  Attorney

PIPELINE LEAK DETECTOR

William M. Bustin, Summit, N.J., and Harry C. Cook, Genoa, Italy, assignors to Esso Research and Engineering Company, a corporation of Delaware
Filed Mar. 28, 1969, Ser. No. 811,519
Int. Cl. G01m 3/24
U.S. Cl. 73—40.5          10 Claims

ABSTRACT OF THE DISCLOSURE

An apparatus for the detection of pipeline leaks, in which an apparatus comprising a sound absorbent canister between front and rear sound detectors designed to move through the pipeline, records the sound generated by the escaping fluid. The leak is located at the point wherein the recording traces, generated by the sound detectors, indicate a sudden change in sound intensity caused by the sound absorbent canister covering the leak.

BACKGROUND OF THE DISCLOSURE

The detection of small leaks in long, large diameter pipelines, for the transport of gases and oils, has been the subject of intensive development. Although the amount of oil or gas lost from the small hole in a pipeline is negligible in comparison to the quantities flowing, it is enough to cause an adverse effect on the soil which is exposed to the leak. Furthermore, the small leak can easily lead to an enlarged hole.

Various devices employing different scientific principles have been employed for the purpose of pipeline leak detection. Among the most successful methods is the one based on the wel-known principle that a fluid escaping through a small opening will generate a distinct sound. Many methods and devices have been disclosed employing this principle. The method and apparatus of the instant invention also employs this principle to detect pipeline leaks. However, the instant invention as will be more fully discussed hereinafter has unique features which are not found in any of the prior art and which enables the instant device to produce highly efficient results.

The device described herein is an apparatus which traverses the pipeline to detect sounds caused by the escape of pipeline fluids. This new apparatus contains dual sound detectors located front and rear of the main body of the device and separated by a sound absorbing canister. This results in a new method wherein two traces are obtained, increasing the accuracy of the determination of the location of the leak.

SUMMARY OF THE INVENTION

The device of the instant invention utilizes two separate sound detector heads located on a body or "pig" which is designed to move down the pipeline. These sound detector heads are located at the ends of the pig. The body of the pig comprises a compartment containing the recorder means and an absorbent canister, cylindrical in shape whose diameter is substantially the same as the inside diameter of the pipe but capable of sliding or rolling therein.

In operation, the detecting device flows inside the pipe, propelled by the momentum of the flowing fluid. When a leak is present, the forward sonic detector, as it approaches the leak, picks up and records the sonic signal that is generated by the escaping fluid. Due to the sound absorbent canister which is located betwen the front and rear heads, the rear sonic detector picks up a much weaker signal at this time. As the apparatus of the instant invention gets close to the leak, the sound intensity as recorded by the front detector head reaches a maximum. Immediately thereafter, the sound intensity is sharply reduced due to the effect of the sound absorbing, tight fitting canister which in one embodiment not only absorbs much of the sound but tends to seal off the leak. After the absorbing canister passes over the hole causing the leak, the noise level increases. However, this sound intensity as recorded by the front detector head is much lower than it was before the canister covered the hole causing the leak. This, of course, is due to the absorbing canister which is now disposed between the hole and the front detector head. However, the intensity of the sound as recorded by the rear detector head upon uncovering of the hole, by the absorbing canister, is at a maximum equal to the intensity recorded by the front detector head prior to the canister covering the hole.

The above procedure results in two sound traces which independently locate the leak at the point of sharp discontinuity in sound intensity.

In another embodiment wheels are provided on the pig and the diameter of the canister is narrower than the inside diameter of the pipeline so as to facilitate relative noiseless movement in pipelines. In this case, the method of locating the leak, based on two sound traces recorded from front and rear recording means, is to determine the point on both traces where there is a sharp decrease and increase in sound intensity of the front and rear detectors respectively.

The sound intensity caused by the escaping fluid is picked up and recorded by conventional recording means. Since the sound intensity from both detector heads is recorded, two traces are obtained resulting in pin-pointing of the leak with more accuracy than heretofore possible.

BRIEF DESCRIPTION OF THE DRAWINGS

The invention may be better understood by reference to the accompanying drawings, of which.

DETAILED DESCRIPTION

Figure 1:
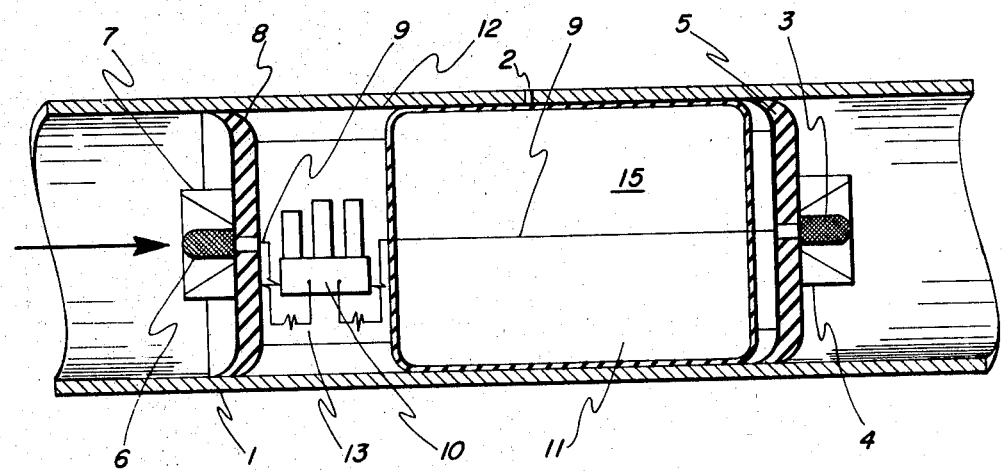
FIG. 1 is an elevation in cross section of the sonic leak detector of the instant invention within a large diameter pipeline having a leak.

Referring specificaly to FIG. 1 in detail, reference numeral 1 denotes a pipeline for the transmission of fluids such as crude oil, natural gas, and the like. For purposes of this discussion, assume pipeline 1 has developed a hole at 2, resulting in a leak of the fluid from the pipeline. The pipeline leak detector illustrated generally at 15 is placed in pipeline 1.

The detector 15 can be conveniently described as comprising two sections. The first, is the body portion which comprises a cylindrically-shaped sound absorbing canister 11 and a sound recording means compartment 13. The other section can be conveniently described as the sonic detector section. It comprises a forward sonic detector head 3 surrounded by a coned sound reflector 4 and a rear sound detector head 6 also surrounded by a coned sound reflector 7. The sound detector heads 3 and 6 are mounted on the first and rear rubber discs respectively located at 5 and 8. Both sonic detector heads are connected by means of connecting wires 9 to the sound sensing and recording circuits 10 located within the recording means compartment 13.

The sound absorbing canister 11 is cylindrically shaped. Its diameter is substantially the same as the inside diameter of the pipeline permitting it to move snugly in the pipeline. Its outer circumferential area is coated with rubber in order to provide relative noiseless operation, while at the same time increasing the wear resistance capability of the canister. If the apparatus of the instant invention is to be employed in a low pressure environment, enclosed cellular foam is used as the sound absorbing canister material. Closed cell foamed polyurethane is employed as a preferred embodiment of a closed cellular foam absorbent. In the case of a pipeline fluid under high pressure, a closed cellular foam cannot be used, since the high pressure in the line would collapse the foam. In such a case, an open cellular polyurethane foam is employed as the sound absorbent.

The sound recording means compartment 13 is located to the rear of the sound absorbing canister 11. It comprises a cylindrically shaped shell with a diameter less than the diameter of the canister. Inside said compartment 13 is located traditional recording means 10 which are electrically connected to the sound detecting heads and adapted to receive signals generated by said heads, and to record said signals.

The sound detectors 3 and 6 are microphones in pipelines in which a gaseous material is flowing. On the other hand, if the fluid flowing is a liquid, hydrophones are used. Coned sound reflectors of the type traditionally used in the recording art are disposed about said detector heads to improve the performance of said detector heads. These sound detector means are mounted on flexible rubber discs numerically denoted respectively as 5 and 8. In addition to the function they have as a mounting platform for the sound detectors these flexible discs also serve to guide the apparatus smoothly through the pipe, by contacting the inside walls of the pipe and thereby helping to prevent motion in any direction other than in the direction of flow. In a preferred embodiment the flexible discs are rubber, although other suitable flexible materials may be substituted.

Figure 2A:
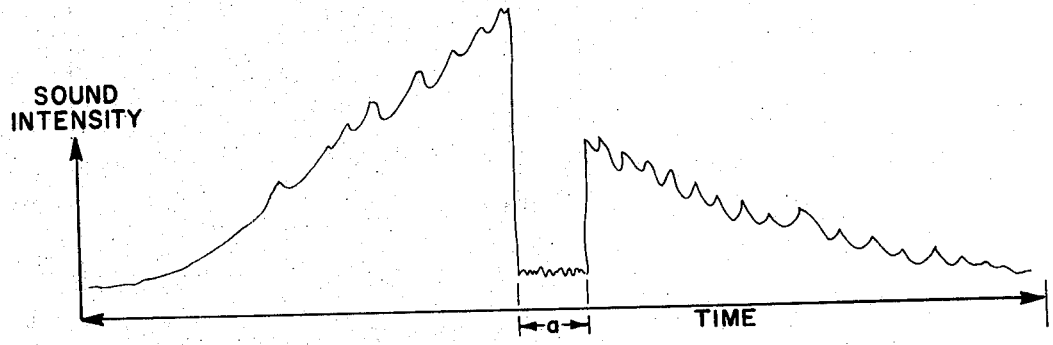
FIGS. 2A and 2B illustrate typical sound intensity traces generated by the apparatus of FIG. 1 as the apparatus approaches and passes the leak.
Figure 2B:
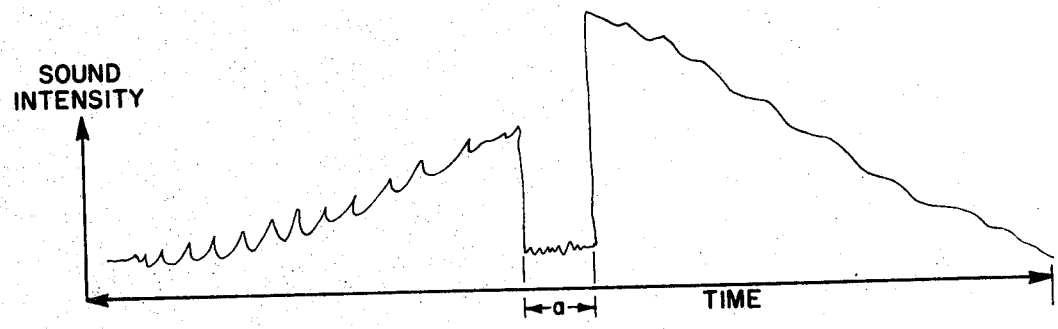

An understanding of the method of operation of this apparatus can be obtained by turning to FIG. 2 in conjunction with FIG. 1. FIGS. 2A and 2B depict typical plots of sound intensity of the front and rear sound detectors respectively as a function of time. The leak detector is propelled along the inside walls of the pipeline 1 by the force of the moving fluid. This is shown in FIG. 1 by the arrow which indicates the direction of flow and movement of the apparatus of the instant invention. The flexible disc mounts, 5 and 8, contact with the inside walls 12 of the pipe. This results in low noise level, while maintaining intimate contact of the leak detector with the inside pipe surface.

As the sonic leak detector approaches a leak in the line, the front sound detector detects an increasingly louder sound emitting from the point of the leak 2. This is shown in FIG. 2A, which is a plot of noise intensity as a function of time in the trace to the left of interval a. As can be seen in FIG. 2A the sound intensity increases until a maximum peak is reached as the front detector reaches the point of the leak. Immediately thereafter, however, the sound absorbing canister covers the leak. Since the canister is tightly mated to the inside pipe wall, the flow through the leak is drastically reduced. Hence, the twin effects of reduced leakage rate and sound absorption results in a sudden lowering of the sound level. This is depicted in FIG. 2A by the sudden drop in sound level for the interval of time a corresponding to the length of time the sound absorbing canister covers the leak. As soon as the leak is uncovered the trace of the sound intensity recorded by the front detector again rises. The level of loudness though, immediately after the leak is uncovered is lower than immediately before the leak was covered, since the front detector is at a distance away from the leak equal to the length of the apparatus, but more importantly, separated from the leak by the sound absorbing canister.

The sound received by the rear sonic detector 6 increases as it approaches the leak as shown in FIG. 2B, the trace of sound intensity as measured by the rear detector head, as a function of time. However, due to its additional distance from the leak and the intervening sound absorbing canister, the sound intensity level is lower than that of the front detector head, to the same extent that the sound intensity from the front detector head is decreased after passing the leak, until the sound absorbing canister clears the leak. At this point, the sound intensity as depicted in FIG. 2B is equal to that of the forward sound detector upstream of the leak, since the rear detector is in the same position relative to the leak after the sound absorbing canister uncovers the leak, as the front detector was as it approached the leak. As the pig moves further away from the leak the sound intensity as measured by the rear detector head falls off as shown in FIG. 2B.

From these two traces the exact location of the leak can be determined. Each trace locates a point of decreased sound intensity equal in time to the time interval during which the sound absorbing canister covered the leak. Hence, the advantage of two sound detectors lies in providing two traces which insure the accuracy of the location of the leak. The exact location of the leak is determined from a correlation of the velocity of the pig which in turn is determined by the velocity of the fluid flowing in the pipeline. From this information, time the abscissa on these charts is correlated to distance and hence the location of the leak is quickly determined from a knowledge of the location at which point the pig is inserted into the pipeline.

Figure 3:
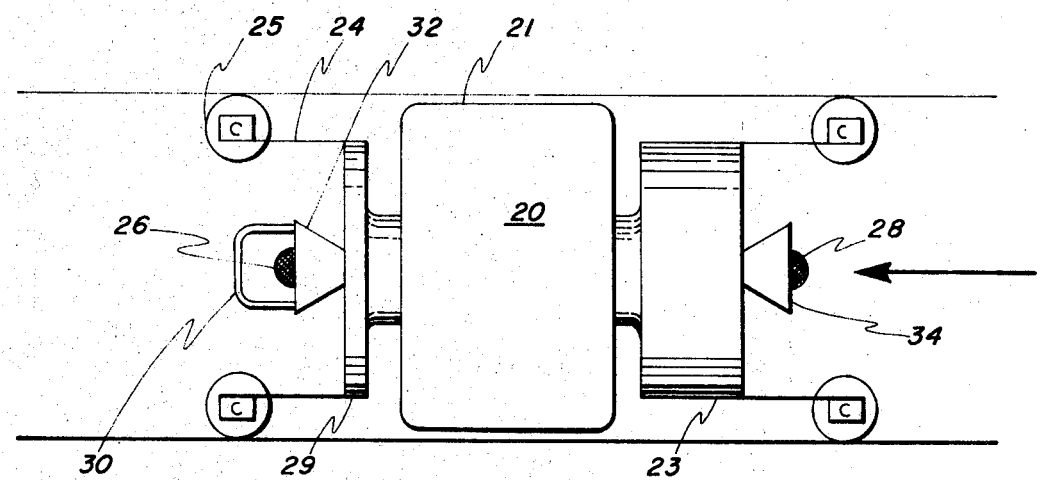
FIG. 3 is an elevation view of another embodiment of thce instant invention.

Turning to FIG. 3, a second embodiment of the instant invention is illustrated. Although this pig comprises the same basic design as the embodiment illustrated in FIG. 1, it differs from that embodiment in that wheels are used in place of flexible discs. The pig indicated generally at 20 has front and rear sound detectors designated as 26 and 28 respectively, each surrounded by front and rear coned sound reflectors at 32 and 34 respectively. These detectors 26 and 28 are again microphones in the case of a gaseous fluid environment, or hydrophones in the case of a liquid pipeline environment.

The front sound detector 26 is provided with a protective guard 30 which also serves as a handle. Both front and rear detectors are mounted to the body portion as defined above. The means by which mounting is accomplished will be described in further detail hereinafter.

A sound absorbing canister 21 is interposed between the front and rear sound detectors, 26 and 28. The absorbing materials used in this embodiment are the same as those used in the embodiment described in FIG. 1. However, in the instant embodiment, the outermost dimensions of the canister walls 21 are less than the inside dimensions of the pipeline walls by about ⅛ inch. This spacing is necessary for the proper functioning of this embodiment as will hereinafter be described.

A sound recording means compartment 23 is positioned adjacent the sound absorbing canister 21 between it and the rear sound detector 28. This compartment 23 is comprised of the same sound recording means as is used in the embodiment disclosed in FIG. 1. The recording means compartment 23 has an additional function in the instant embodiment of serving as a mounting for the rear sound detector 28 and rear sound reflector 34. The front sound detector 26 and reflector 32 are mounted to the body portion of the instant apparatus by means of a mounting platform 29, which is connected to the sound absorbent canister 21.

Movement of the "pig" 20 is provided by the momentum of the fluid flowing. Hence, the pig moves in the direction of the flowing fluid. In the instant embodiment the pig moves through the pipeline on wheels 25 disposed at the four edges of the apparatus. These wheels 25 are supported on cantilever springs 24 which communicate with the body portion of the apparatus at the front and rear ends of the apparatus by attachment of the springs to the mounting platform 29 and to the sound recording means compartment 23 respectively. The use of wheels 25 necessitate that the sound absorbing canister 21 be disposed away from the pipeline walls to the extent that said canister 21 does not touch the walls.

Wheels are used in those pipeline applications where it is especially desirable to reduce extraneous noise. It should be remembered that in this embodiment the wheels of the pig are the only part of the apparatus that contacts the inside pipeline walls, thus accounting for the reduced noise effect.

Although four wheels are illustrated in FIG. 3, it should be understood that each end of the pig will be provided with as many wheels and cantilever springs attached to the body portion as is necessary for stable locomotion within the pipeline, depending upon the geometry of the pipeline.

Figure 4A:
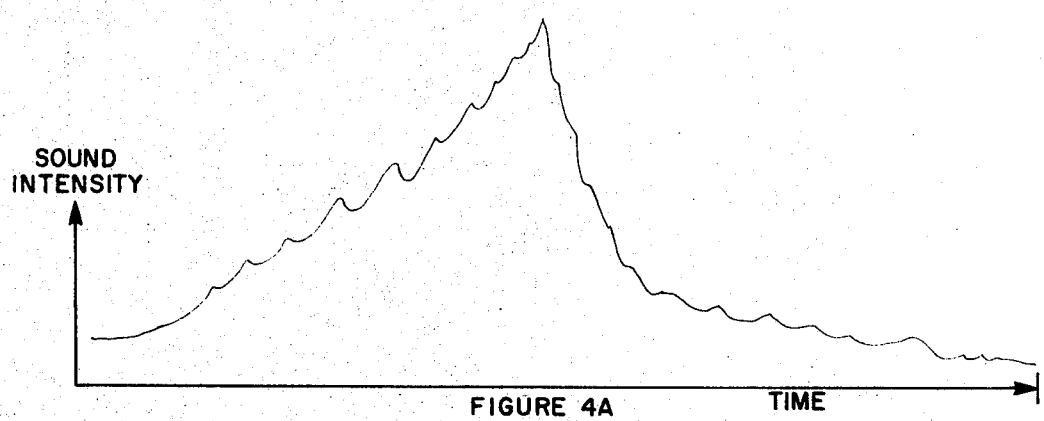
FIGS. 4A and 4B are typical sound intensity traces generated by the embodiment depicted in FIG. 3.

The method of operation of the embodiment disclosed in FIG. 3 can be better understood by reference to FIG. 4. FIG.4A is a plot of sound intensity as recorded by the front sound detector, as a function of time. The sound intensity increases to a maximum until the canister portion of the pig covers the leak. At this point the sound intensity decreases rapidly due to the intervening sound absorbing canister. As the pig further proceeds downstream of the leak, the sound further decreases since the only change downstream of the leak is the increased distance from the source of the leak. The sound absorbing effect on the front detector is constant downstream of the leak, since the plugging effect of the canister present in the previous embodiment is not present in this embodiment.

Similarly the trace of the sound intensity of the rear detector starting at a point upstream of the leak increases very gradually as it approaches the leak. This is due to the sound absorbing effect of the sound absorbing canister disposed between the leak and the rear detector. Thus, the only change recorded by the rear detector as the detector approaches the leak is the slight increase in sound intensity due to decreased distance from the sound source. This effect continues until the plug is in immediate proximity of the hole causing the leak. Then the sound intensity increases rapidly reaching a peak as the rear detector is in direct line with the leak. From that point on, the sound intensity decreases rather rapidly as a function of decrease of sound intensity with distance.

Figure 4B:
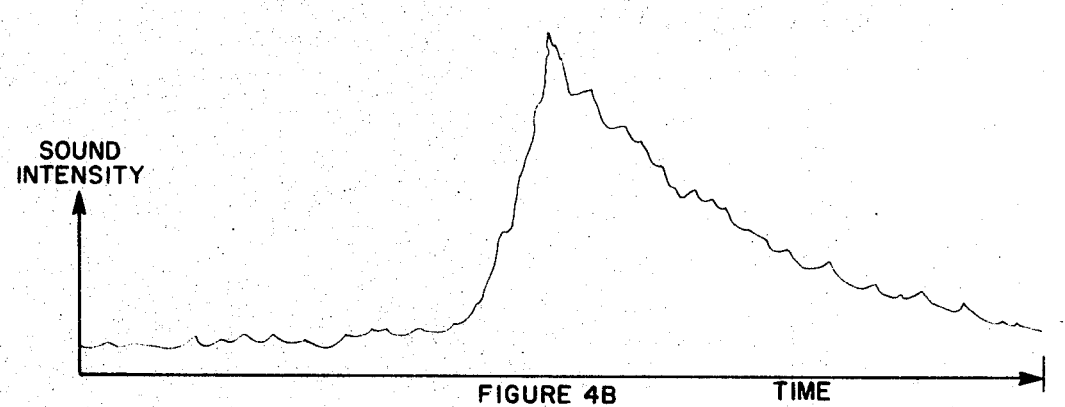

The location of the leak is determined from each of the two traces of FIG. 4 at the time interval equivalent to the period of marked decrease in sound intensity of the forward sound detector as illustrated in FIG. 4A and the period of marked increase in sound intensity of the rear sound detector as illustrated in FIG. 4B. As in the previous embodiment, the distance traversed by the pig equivalent to the time of these marked changes in sound intensity, provides the exact location of the leak.

What is claimed is:

1. An apparatus for the detection of leaks in a pipeline comprising:
    (a) a body portion comprising a sound absorbing canister, said canister filled with a sound absorbing material, and whose periphery is adjacent the walls of said pipeline;
    (b) a first sound detector means mounted at one end of said body portion;
    (c) a second sound detector means mounted at the other end of said body portion; and
    (d) a sound recording means, housed in said body portion, adapted to receive signals generated by said first and second sound detector means.

2. The apparatus of claim 1 wherein said body portion also includes a sound recording means compartment located adjacent to said canister.

3. The apparatus as claimed in claim 1 including first and second flexible discs located at the front and rear of said body portion respectively upon which said first and second sound detecting means are mounted.

4. The apparatus of claim 1 wherein said body portion is provided with wheels adapted to roll along the inside walls of said pipeline.

5. The apparatus of claim 4 wherein said first detector means is disposed on a mounting platform at one end of said body portion and said second detector means is mounted at the other end of said body portion.

6. The apparatus of claim 5 including a protective guard disposed around said first detector means.

7. An apparatus for the detection of leaks in a pipeline comprising:
    (a) a body portion comprising a coated cylindrical sound-absorbing canister, said canister filled with a sound absorbing material;
    (b) a first sound detector means mounted at one end of said body portion;
    (c) a second sound detector means mounted at the other end of said body portion; and
    (d) a sound recording means housed in said body portion adapted to receive signals generated by said first and second sound detector means.

8. The apparatus of claim 7 wherein said cylindrical canister is coated with rubber over its circumferential surface area.

9. The apparatus of claim 7 wherein the sound absorbing material contained within said canister is a closed cell foamed polyurethane when the apparatus is used in a low pressure environment.

10. The apparatus of claim 7 wherein the sound absorbing material contained within said canister is open cellular polyurethane when the apparatus is used in a high pressure environment.

References Cited

UNITED STATES PATENTS

| | | | |
|---|---|---|---|
| 2,884,624 | 4/1959 | Dean et al. | 73—40.5X |
| 2,940,302 | 6/1960 | Scherbatskoy | 73—40.5 |
| 3,413,653 | 11/1968 | Wood | 73—40.5X |

S. CLEMENT SWISHER, Primary Examiner

W. A. HENRY II, Assistant Examiner